United States Patent [19]

Martin et al.

[11] Patent Number: 4,645,178
[45] Date of Patent: Feb. 24, 1987

[54] REDUNDANT DRIVE MECHANISMS FOR A DIRECT DRIVE VALVE AND FORCE MOTOR ASSEMBLY

[75] Inventors: Eugene J. Martin, Portage; James N. Tootle, Kalamazoo; Walter Fallows, Kalamazoo; Howard Lambers, Kalamazoo; Robert D. Vanderlaan, Kalamazoo, all of Mich.

[73] Assignee: Pneumo Abex Corporation, Boston, Mass.

[21] Appl. No.: 800,715

[22] Filed: Nov. 22, 1985

[51] Int. Cl.[4] .............................................. F16K 31/44
[52] U.S. Cl. ............................. 251/229; 251/129.11; 137/625.65; 74/44; 74/579 R; 74/588
[58] Field of Search ............... 74/51, 105, 44, 579, 74/588; 251/229, 129.11, 129.03; 137/625.65

[56] References Cited

U.S. PATENT DOCUMENTS

| | | | |
|---|---|---|---|
| 1,197,133 | 9/1916 | Lawry | 74/579 |
| 1,885,976 | 11/1932 | Yandell | 74/588 |
| 2,155,752 | 4/1939 | Brand | 74/579 |
| 2,263,647 | 11/1941 | Ryder | 74/44 |
| 2,315,389 | 3/1943 | Benson et al. | 74/44 |
| 2,534,791 | 12/1950 | Moyer | 74/579 |
| 2,797,706 | 7/1957 | Harrison | 251/129.11 |
| 4,285,496 | 8/1981 | Coles | 251/129.03 |
| 4,526,342 | 7/1985 | Wakefield | 251/129.11 |

FOREIGN PATENT DOCUMENTS 2141519 2/1973 Fed. Rep. of Germany ....................... 251/129.11

Primary Examiner—A. Michael Chambers
Attorney, Agent, or Firm—Renner, Otto, Boisselle & Lyon

[57] ABSTRACT

Multiple drive paths are provided between the valve plunger and force motor of a direct drive valve and force motor assembly whereby should one of the drive paths fail, the force motor can still be used to drive the valve plunger through another drive path. One of the drive paths consists of a drive shaft having one end drivingly connected to an eccentric on the motor output shaft and the other end connected to the end of the valve plunger remote from the motor output shaft. The drive shaft is desirably provided with an enlarged head portion having a flat annular surface on the axial inner end thereof in close proximity to a corresponding flat end face on the end of the valve plunger closest to the motor output shaft, whereby should the valve plunger break, the drive shaft will hold the valve plunger together and allow for degraded valve performance.

30 Claims, 10 Drawing Figures

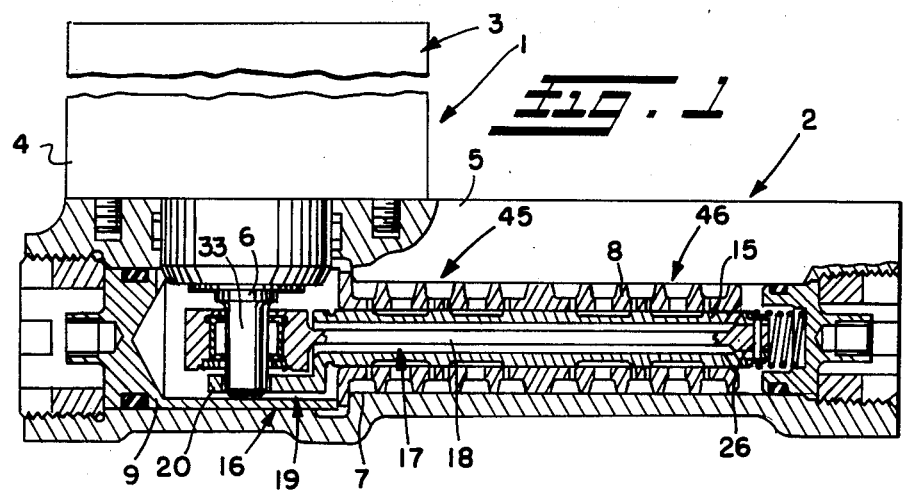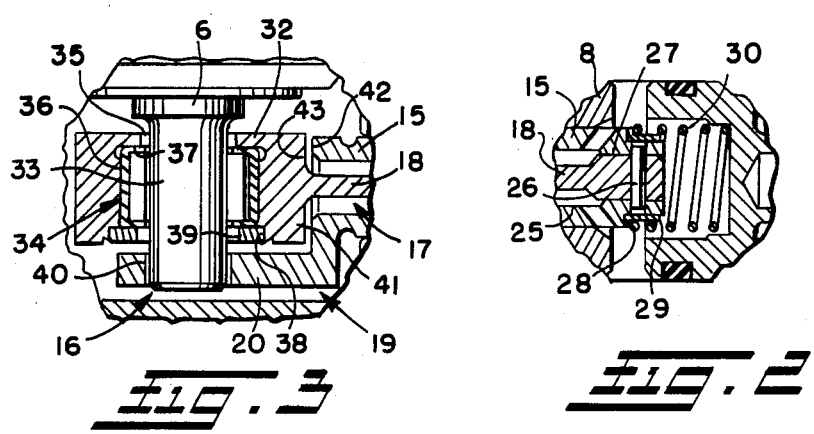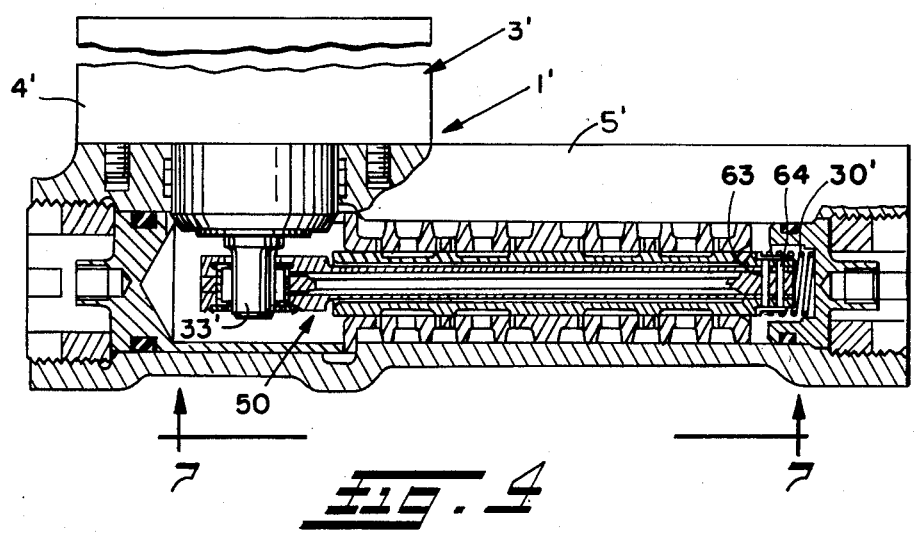

REDUNDANT DRIVE MECHANISMS FOR A DIRECT DRIVE VALVE AND FORCE MOTOR ASSEMBLY

BACKGROUND OF THE INVENTION

This invention relates generally as indicated to redundant drive mechanisms for a direct drive valve and force motor assembly, whereby should a failure occur in one of the drive mechanisms, the valve can still be operated through another drive mechanism and vice versa.

In certain types of high pressure fluid proportional servo control systems such as a control actuation system for aircraft in which the fluid pressure may for example be on the order of 1000 psi or more, it has been found advantageous to use a direct drive valve of relatively short stroke. For such applications, it would be desirable to provide a redundant drive mechanism between the valve member and force motor used to drive the valve, whereby should one of the drive mechanisms fail, the force motor can still be used to drive the valve through another drive mechanism and vice versa. Also, it would be desirable to provide for degraded valve performance in the event of a breakage of the valve plunger.

SUMMARY OF THE INVENTION

With the foregoing in mind, it is a principal object of this invention to provide multiple drive paths between the valve plunger and force motor, whereby should a failure occur in one of the drive paths, the force motor can still be used to control the movements of the valve plunger through another drive path.

Another object is to provide for degraded valve performance in the event of a breakage of the valve plunger.

Yet another object is to provide for increased load capacity between the force motor and valve plunger.

In one form of the invention, a primary drive path is formed by a drive shaft which directly connects the valve plunger to the motor output shaft, whereas a secondary drive path is formed by a drive tang on the valve plunger which fits over the motor output shaft. Sufficient clearance is desirably provided between the drive tang and motor output shaft such that the normal drive path between the force motor and valve plunger will be through the primary drive path. However, should the drive shaft break, the drive tang on the valve plunger will still permit degraded valve performance through the secondary drive path.

Alternatively, a plurality of drive shafts may be used to connect the valve plunger to the motor output shaft for providing such multiple drive paths therebetween. In one such arrangement, concentric drive shafts are provided, whereas in another arrangement, the drive shafts are stacked one on top of the other and mechanically held together along mating surfaces between such drive shafts.

In accordance with another aspect of the invention, one or more of the drive shafts desirably has an enlarged head portion providing a close clearance with the outer end of the valve plunger, whereby should the valve plunger break, the valve plunger will still be held together by such one load path to allow for degraded valve performance.

In accordance with yet another aspect of the invention, dual cross pins may be provided for connecting the valve plunger to each load path (drive shaft) to provide single pin failure operation. A spring seat retainer sleeve preferably retains the pins through the valve plunger and load paths. Also, a cage needle roller bearing is desirably provided between the motor output shaft and one or more such load paths to provide increased load capacity.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a fragmentary longitudinal section through a direct drive valve and force motor assembly including one form of redundant drive mechanism in accordance with this invention between the motor output shaft and valve plunger;

FIG. 2 is an enlarged fragmentary longitudinal section of the right end of the valve plunger of FIG. 1, showing the manner of connection of one of the drive mechanisms to the end of the valve plunger furthest from the motor output shaft;

FIG. 3 is an enlarged fragmentary longitudinal section of the left end of the valve plunger of FIG. 1, showing the manner of connection of both drive mechanisms to the motor output shaft and the close clearance between an enlarged head portion on one of the drive mechanisms and the end of the valve plunger nearest the motor output shaft;

FIG. 4 is a fragmentary longitudinal section similar to FIG. 1 but showing another form of redundant drive mechanism in accordance with this invention between the motor output shaft and valve plunger;

DETAILED DESCRIPTION OF THE PREFERRED EMBODIMENTS

Figure 5:
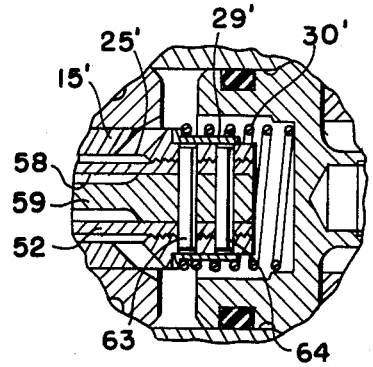
FIG. 5 is an enlarged fragmentary longitudinal section of the right end of the valve plunger of FIG. 4, showing the manner of connection of two drive mechanisms of the valve plunger.
Figure 6:
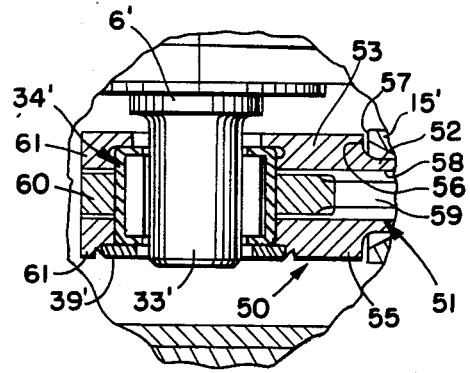
FIG. 6 is a fragmentary longitudinal section of the left end of the valve plunger of FIG. 4 showing the manner the connection of both drive mechanisms to the motor output shaft and the relatively close clearance between an enlarged head portion on one of the drive mechanisms and the end of the valve plunger nearest the motor output shaft.

Referring now in detail to the drawings and initially to FIG. 1, there is illustrated one form of direct drive valve and force motor assembly 1 including a valve member 2 which is directly driven by a force motor 3. As shown, the motor 3 includes a motor housing 4 which may be bolted or otherwise clamped to the valve housing 5 with the motor output shaft 6 extending perpendicularly into a longitudinal bore 7 in the valve housing. Contained within the bore 7 is a valve sleeve 8 which may be held against movement within the bore as by means of a retainer member 9 suitably retained in the outer end of the bore.

Within the valve sleeve 8 in an axially movable valve plunger 15. The motor output shaft 6 is drivingly connected to the valve plunger by a redundant drive mechanism 16 which in the form shown in FIGS. 1-3 consists of a primary drive mechanism 17 in the form of a flexible drive shaft or quill 18 connected at its opposite ends to the valve plunger 15 and motor shaft 6, respectively, and a secondary drive mechanism 19 in the form of a drive tang 20 on the valve plunger which fits over the motor output shaft.

The valve plunger 15 being tubular includes an axial bore 25 through which the drive shaft 18 extends for connection to the end of the valve plunger furthest from the motor output shaft as by means of a pin 26 extending through aligned transverse holes or slots in the valve plunger and drive shaft, respectively. Also, a threaded connection 27 may be provided between the drive shaft and valve plunger to permit adjustment of the neutral or null position of the valve plunger relative to the null position of the force motor prior to inserting the pin to prevent relative rotation therebetween. If desired, the drive shaft may also be brazed to the valve plunger following such adjustment.

Preferably, the axial inner end of the valve plunger has an external shoulder 28 against which a spring retainer sleeve 29 is seated in overlying relation to the ends of the pin 26 by the force of a spring 30 interposed between the valve plunger and inner end of the valve bore for retaining the pin in place.

As best seen in FIG. 3, the drive shaft 18 extends outwardly beyond the outer end of the valve plunger 15 for connection to the motor output shaft 6 as by means of a lug 32 on the outer end of the drive shaft which receives an eccentric 33 on the motor output shaft. For increased load capability, a caged needle roller bearing 34 may be used to provide the driving connection between the eccentric 33 and lug 32. To retain the needle bearing in place, the lug opening 35 may have a counterbore 36 extending part way therethrough thus providing a shoulder 37 at its inner end which acts as a bearing retainer. At the outer end is another counterbore 38 for receipt of a washer 39 which also acts as a bearing retainer at such other end. The washer may be fastened in place as by staking the washer to the wall of the counterbore 38.

The eccentric 33 rotates about a 90° centerline relationship between the motor 3 and valve 2 to convert rotary motion to linear motion. The drive shaft 18, being flexible, accommodates such eccentric drive movements without inducing unacceptable plunger side loads and associated friction, and acts as the primary load path between the motor output shaft and valve plunger.

As previously indicated, a drive tang 20 also extends between the motor output shaft 6 and valve plunger 15 to provide a secondary load path in the event that the drive shaft 18 should break. The drive tang may be integrally connected to the outer end of the valve plunger and extends radially and axially around one side of the lug 32 and has a transverse opening 40 therein for receipt of the eccentric 33. Preferably, the opening 40 is a slot with its narrow width in the plane shown sufficiently greater (for example between approximately 0.002 and 0.003 inch per side) than the O.D. of the eccentric such that during normal operation, the valve movements are controlled by the primary drive shaft 18. The wider depth of the slot provides room for the transverse motion of the drive shaft 18 as it travels through its normal motion. However, should the drive shaft 18 break, the valve plunger will be directly driven through the drive tang 20. Since the clearances between the eccentric and drive tang are greater than those between the eccentric and drive shaft, the valve performance will drop off somewhat when driven by the drive tang, thus indicating to the operator that the primary drive path has failed.

Another important aspect of the redundant drive mechanism shown in FIGS. 1-3 is that one of the drive mechanisms, in this case the primary drive shaft 18, has an enlarged head portion 41 adjacent the outer end of the valve plunger 15, with a flat annular surface 42 on the axial inner end thereof overlying a correspondingly flat end face 43 on the valve plunger. The clearance space between the head portion surface 43 and adjacent valve plunger end face 42 is desirably kept to a minimum (for example between approximately 0.001 and 0.002 inch), whereby if during operation the valve plunger itself should break and a portion should separate, the drive shaft 18 will still hold the valve plunger together and permit the valve plunger to continue to operate with minimum leakage through the ends of the valve plunger. Also, the valve plunger 15 preferably has two fluidically isolated valving sections indicated generally at 45 and 46 in FIG. 1, whereby if the valve plunger breaks making one of the valving sections inoperative, the other valving section will still be able to supply fluid pressure to its associated actuator. With such a construction, control will be maintained even when one of the valving sections shuts down, thus providing a redundancy feature that increases safe operation of the aircraft.

In FIGS. 4-7 and FIGS. 8-10 there are shown two other forms of redundant drive mechanisms 50 and 70 in accordance with the present invention for providing a drive connection between a direct drive valve and force motor assembly similar to that previously described, and the same reference numerals followed by a prime symbol are used to designate like parts. Also in the FIGS. 4-7 embodiment, one of the drive mechanisms 51 is very similar to the primary drive mechanism 17 of the FIGS. 1-4 embodiment. That is, such drive mechanism 51 includes a flexible drive shaft or quill 52 connected at its inner end to the inner end of the valve plunger 15' and extending outwardly therefrom through the axial bore 25' in the valve plunger for connection to the eccentric 33' on the motor output shaft 6' as by means of a clevis 53 containing a caged needle roller bearing 34'. Also, the outer end of the drive shaft 52 desirably includes an enlarged head portion 55 having limited clearance between a flat axial inner end portion 56 thereon and a correspondingly flat end face 57 on the outer end of the valve plunger.

However, instead of providing a drive tang on the valve plunger, the flexible drive shaft 52 is hollow, including a longitudinal bore 58 extending therethrough for receipt of another flexible drive shaft or quill 59 concentrically within the first drive shaft 52. Also, the outer end of the second drive shaft 59 has a lug 60 thereon which is received between a pair of arms 61 on the first drive shaft 52 and fits over the eccentric 33' around the caged needle roller bearing 34' to provide a second drive connection therebetween. The inner ends of both such drive shafts 52, 59 are desirably pinned to the inner end of the valve plunger 15' by one or more cross pins retained in place by a spring retainer sleeve 29' as before. Two such cross pins 63, 64 are shown in the FIGS. 4–7 embodiment to provide single pin failure operation of the valve.

Figure 7:
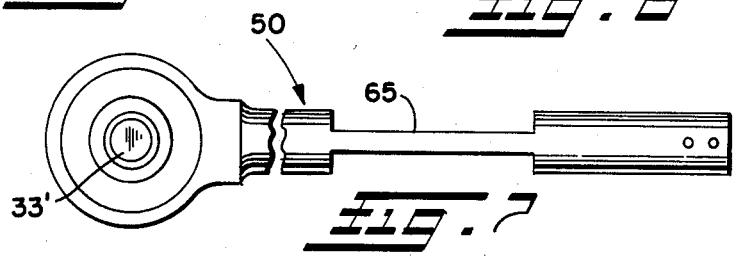
FIG. 7 is a side elevation view of one of the drive mechanisms of the FIGS. 4–6 embodiment as generally seen from the plane of the line 7—7 of FIG. 4, but with the valve housing and associated valve sleeve and valve plunger removed.

The inner drive shaft 59, being of a smaller diameter than the outer tubular drive shaft 52, can readily be made sufficiently thin to give it the desired flexibility. To impart the desired flexibility to the outer drive shaft 52, reduced sections 65 are desirably provided on opposite sides of the outer drive shaft intermediate the ends of the length thereof as shown in FIG. 7.

With such a drive mechanism, if either of the drive shafts 52, 59 should break, the valve 2 is still operable through the other drive shaft. Likewise, if one of the cross pins 63, 64 should break, the other cross pin will still maintain the integrity of the drive connections to the valve plunger 15'. If the valve plunger should fail, the outer drive shaft 52 will still hold the valve plunger together and permit the valve plunger to continue to operate with minimum leakage through the outer end of the valve plunger, similar to the FIGS. 1–3 embodiment.

Figure 8:
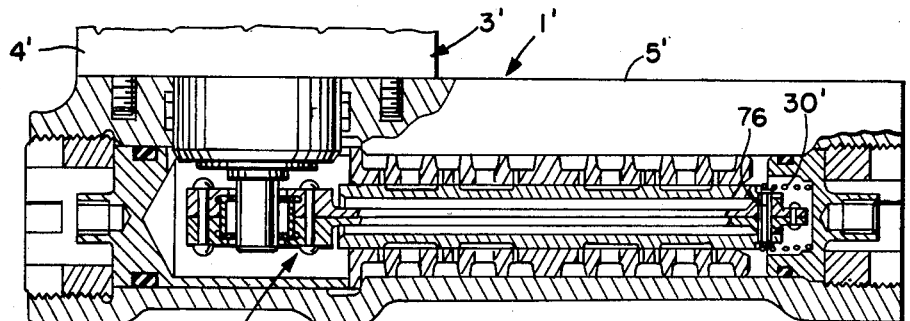
FIG. 8 is another fragmentary longitudinal section similar to FIGS. 1 and 4 but showing still another form of redundant drive mechanism in accordance with this invention between the motor output shaft and valve plunger.
Figure 9:
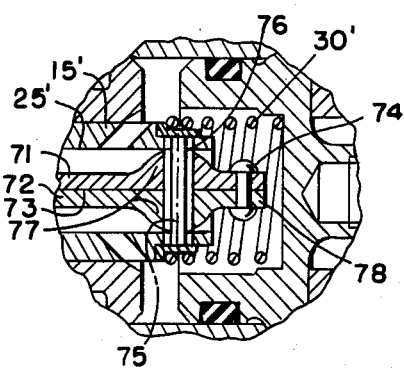
FIG. 9 is an enlarged fragmentary longitudinal section of the right end of the valve plunger of FIG. 8, showing the manner of connection of two drive mechanisms to the valve plunger.
Figure 10:
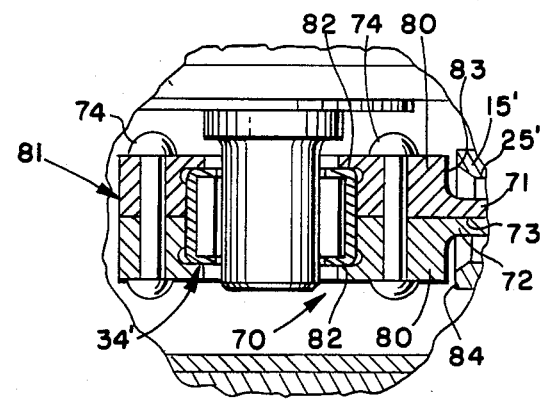
FIG. 10 is an enlarged fragmentary longitudinal section of the left end of the valve plunger showing the manner of connection of both drive mechanisms to the motor output shaft and an enlarged head portion on both of the drive mechanisms in close clearance to the end of the valve plunger nearest the motor output shaft.

The redundant drive mechanism 70 shown in FIGS. 8–10 embodiment is similar to the redundant drive mechanism 50 previously described in that two separate drive shafts 71, 72 extend through the longitudinal bore 25' in the valve plunger 15'. However, in this case the drive shafts are desirably identical and have flat mating surfaces 73 to permit them to be stacked one on top of the other and mechanically held together with rivets 74 or local welds along such mating surfaces. The drive shafts 71, 72 when thus connected together are also rigid, rather than being flexible, thereby necessitating that they be pivotally connected to the inner end of the valve plunger.

Preferably, such pivotal connection is formed by a pair of concentric cross pins, i.e., a solid cross pin 75 received within an outer tubular cross pin 76 (see FIG. 9), which allows for single pin failure operation similar to the FIGS. 4–7 embodiment. Also, a spring retainer sleeve 29' arrangement may be used to retain the cross pins in place as in the previous embodiments. The inner ends of the drive shafts desirably include semispherical projections 77 thereon facing in opposite directions to provide in effect a ball joint through which the concentric cross pins 75, 76 extend. The innermost ends of the drive shafts 71, 72 also dsirably extend slightly beyond the inner end of the valve plunger to act as a valve stop 78 therefor.

At the outer ends of the drive shafts 71, 72 are enlarged head portions 80 each of which forms one half of a cage 81 for trapping the needle bearing 34' between oppositely facing shoulders 82 at opposite sides of the head portions during riveting of the two drive shafts together thereby eliminating the need for having to stake the needle bearing in place. Also, the separate enlarged head portions 80 on the drive shafts 71, 72 cooperate to provide a flat axial inner end surface 83 having a minimum clearance with a correspondingly flat end face 84 on the outer end of the valve plunger, whereby if the valve plunger should break and a portion should separate, the redundant drive mechanism 70 will still hold the valve plunger together and permit it to continue to operate with minimum leakage through the outer end of the valve plunger.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A direct drive valve and force motor assembly comprising a valve member containing a linearly movable valve plunger, a force motor having a motor output shaft, and redundant drive means providing plural drive paths between said valve plunger and motor output shaft, whereby should a failure occur in one of said drive paths, said force motor can still be used to control the movements of said valve through another drive path and vice versa, said motor output shaft extending perpendicular to the axial centerline of said valve plunger, an eccentric on said motor output shaft, said valve plunger including an axial bore, and said redundant drive means including a drive shaft connected to said valve plunger and extending from said axial bore outwardly beyond and end thereof closest to said motor output shaft, said drive shaft having a drive connection with said eccentric to provide a primary load path between said motor and valve, and a drive tang on said end of said valve plunger drivingly connected to said eccentric to provide a secondary load path between said motor and valve in the event of failure of said primary load path.

2. The assembly of claim 1 wherein greater clearances are provided between said eccentric and drive tang than between said eccentric and drive shaft, whereby the valve performance will drop off when said valve is driven by said drive tang, thus indicating a failure of said primary drive path.

3. The assembly of claim 1 wherein pin means are provided for connecting said drive shaft to said valve plunger.

4. The assembly of claim 3 further comprising spring retainer means surrounding said valve plunger in overlying relation to the ends of said pin means for retaining said pin means connection between said drive shaft and valve plunger.

5. The assembly of claim 1 wherein there is a rigid connection between said valve plunger and said drive shaft, said drive shaft being flexible to accommodate transverse movements of said eccentric during rotation of said motor output shaft.

6. The assembly of claim 5 wherein said rigid connection comprises a threaded connection between said valve plunger and drive shaft, and removable pin means extending through said valve plunger and drive shaft to prevent relative rotation therebetween.

7. The assembly of claim 1 wherein the end of said drive shaft which extends outwardly beyond said end of said valve plunger has an enlarged head portion thereon including a flat axial inner end surface having a relatively close clearance with a correspondingly flat end face on said end of said valve plunger, whereby if said valve plunger should break, said drive shaft will still hold said valve plunger together and permit said valve to operate with minimum leakage through said end of said valve plunger.

8. The assembly of claim 7 wherein said valve plunger has two fluidically isolated valving sections, whereby is said valve plunger breaks making one of said valving sections inoperative, the valve will still be able to supply fluid through said other valving section.

9. A direct drive valve and force motor assembly comprising a valve member containing a linearly movable valve plunger, a force motor having a motor output shaft, and redundant drive means providing plural drive paths between said valve plunger and motor output shaft, whereby should a failure occur in one of said drive paths, said force motor can still be used to control the movements of said valve through another drive path and vice versa, said valve plunger including an axial bore, and said redundant drive means including two drive shafts each having one end connected to said valve plunger within said bore adjacent an end thereof furthest from said motor output shaft and extending through said axial bore outwardly beyond an end thereof closest to said motor output shaft, and means for independently connecting another end of each of said drive shafts to said motor output shaft.

10. The assembly of claim 9 wherein said motor output shaft extends perpendicular to the axial centerline of said valve plunger, and there is an eccentric on said motor output shaft, and said another ends of said drive shafts which extend beyond said end of said valve plunger have independent drive connections with said eccentric.

11. The assembly of claim 10 wherein said drive shafts are concentrically arranged one within the other within said axial bore.

12. The assembly of claim 10 wherein said drive shafts are stacked one on top of another within said axial bore.

13. The assembly of claim 9 wherein pin means are provided for connecting both of said drive shafts to said valve plunger within said bore.

14. The assembly of claim 13 further comprising spring retainer means surrounding said valve plunger in overlying relation to the ends of said pin means for maintaining said pin means connection between both of said drive shafts and said valve plunger.

15. The assembly of claim 13 wherein said pin means comprises a pair of pin connections between said valve plunger and each of said drive shafts to provide single pin failure operation of said valve.

16. The assembly of claim 13 wherein said pin means comprises a pair of concentric pins extending through said valve plunger and each of said drive shafts to provide single pin failure operation of said valve.

17. The assembly of claim 9 further comprising a rigid connection between said valve plunger and each of said drive shafts, each of said drive shafts being flexible to accommodate transverse movements of said eccentric during rotation of said motor output shaft.

18. The assembly of claim 17 wherein said rigid connection comprises a threaded connection between said valve plunger and one of said drive shafts, and removable pin means extending through said valve plunger and both of said drive shafts to prevent relative rotation between said drive shafts and said valve plunger.

19. The assembly of claim 18 further comprising spring retainer means surrounding said valve plunger in overlying relation to the ends of said pin means for retaining said pin means connection between said drive shafts and said valve plunger.

20. The assembly of claim 10 wherein said drive shafts are rigid, and a pivotal connection is provided between said drive shafts and said valve plunger to accommodate transverse movements of said eccentric during rotation of said motor output shaft.

21. The assembly of claim 20 wherein said drive shafts are stacked one on top of another within said axial bore, and means are provided for securing said drive shafts together along the length of said drive shafts.

22. The assembly of claim 21 wherein said drive shafts have semi-spherical projections thereon facing in opposite directions within said axial bore, and pin means extend through said valve plunger and semispherical projections to provide such pivotal connection.

23. The assembly of claim 21 wherein the ends of said drive shafts which extend outwardly beyond said end of said valve plunger have enlarged head portions thereon which cooperate to form a clevis for receipt of said eccentric.

24. The assembly of claim 23 wherein each of said enlarged head portions forms one-half of a cage for a needle bearing surrounding said eccentric.

25. The assembly of claim 24 wherein said enlarged head portions have oppositely facing shoulders at opposite sides thereof for trapping said needle bearing between said shoulders during securing of said drive shafts together.

26. The assembly of claim 23 wherein each of said enlarged head portions cooperate to provide a flat axial inner end surface having a relatively small clearance with a correspondingly flat end face on said end of said valve plunger, whereby if said valve plunger should break, said drive shafts will still hold said valve plunger together and permit said valve to operate with minimum leakage through said end of said valve plunger.

27. The assembly of claim 26 wherein said valve plunger has two fluidically isolated valving sections, whereby if said valve plunger breaks making one of said valving sections inoperative, the valve will still be able to supply fluid through said other valving section.

28. The assembly of claim 10 wherein one of said drive shafts is tubular, and the other of said drive shafts is concentrically disposed within said one drive shaft.

29. The assembly of claim 28 wherein the drive connection on said one drive shaft includes a pair of spaced apart arms for receipt of the drive connection on said other drive shaft therebetween.

30. The assembly of claim 29 wherein said one drive shaft has an enlarged head portion including a flat axial inner end surface having a relatively small clearance with a correspondingly flat end face on said end of said valve plunger, whereby if said valve plunger should break, said one drive shaft will still hold said valve plunger together and permit said valve to operate with minimum leakage through said end of said valve plunger.

* * * * *